United States Patent [19]

Hatzikazakis

[11] Patent Number: 5,154,204
[45] Date of Patent: Oct. 13, 1992

[54] AUTOMATIC DRAIN VALVE FOR A COMPRESSED AIR SYSTEM

[75] Inventor: Michael V. Hatzikazakis, Greer, S.C.

[73] Assignee: Westinghouse Air Brake Company, Wilmerding, Pa.

[21] Appl. No.: 732,887

[22] Filed: Jul. 19, 1991

[51] Int. Cl.⁵ ............................................. F16T 1/00
[52] U.S. Cl. .................................... 137/203; 251/61.2
[58] Field of Search .................... 137/204, 203, 61.2, 137/61.3

[56] References Cited

U.S. PATENT DOCUMENTS

| | | | |
|---|---|---|---|
| 2,285,802 | 6/1942 | Cahusac | 137/204 |
| 2,619,985 | 12/1952 | Wilkerson | 251/63.3 |
| 3,254,805 | 6/1966 | Barger | 137/204 X |
| 3,509,901 | 5/1970 | Hollibaugh | 137/204 |
| 3,575,199 | 4/1971 | Beattie | 137/203 |
| 3,945,302 | 3/1976 | Downs | 251/61.2 |

*Primary Examiner*—Alan Cohan
*Attorney, Agent, or Firm*—J. B. Sotak

[57] ABSTRACT

A pneumatically actuated drain valve device for venting the moisture in an air dryer to atompshere including a rolling diaphragm for linearly moving a piston stem assembly to unseat a spring and pressure biased stainless steel ball valve from its conically shaped valve seat to permit the collected moisture in an accumulation chamber to pass through a sintered exhaust muffler to the atmosphere.

9 Claims, 2 Drawing Sheets

AUTOMATIC DRAIN VALVE FOR A COMPRESSED AIR SYSTEM

FIELD OF THE INVENTION

This invention relates to a drain valve and more particularly to an automatic pneumatically operated drain valve device for removing collected moisture and/or contaminants from an air dryer of a compressed air system.

BACKGROUND OF THE INVENTION

It is common practice in compressed air systems to pass the pressurized air through an air dryer prior to being delivered to a storage reservoir or the like. The air dryer, such as, a C-1 air dryer, manufactured and sold by the Westinghouse Air Brake Company of Spartanburg, S.C., not only extracts water vapor, but also removes other contaminants entrained in the compressed air. The collected contaminants must be periodically drained from the C-1 type of air dryer. In order to remove the condensates, the air dryers are frequently provided with a normally closed pneumatically operated drain valve. In practice, the drain valve is opened during the compressor "OFF" cycle to permit the flow of purge air to atmosphere, and exhausts the discharge system of the air compressor unit. Presently, a D-4 type of pneumatic activated drain valve is used in combination with the C-1 air dryer. The existing drain valve employs a piston-stem assembly in which a brass piston is attached to a stainless steel stem. The piston includes a pair of annular grooves for receiving rubber O-rings which slide within a stainless steel bushing which is press-fitted within the housing or casing of the drain valve. The remote end of the stem carries a valve seal which is cooperatively associated with a valve seat located within the housing. A compression biasing spring engages the piston member and normally urges the valve seal toward the valve seat to a closed position when the compressor is turned ON. When the compressor is turned OFF, a pressure chamber is pressurized to cause the linear movement of the piston stem assembly to open the valve seat and to purge the moisture vapor from the air dryer. It has been found that there is a leakage and seizure problem with these previous drain valves. The lack of lubrication causes wear on the rubber O-rings which results in leakage. In addition, the absence of lubricity results in high static and dynamic frictional forces which act against the spring loading and therefore the valve seal does not completely and tightly seal against the valve seat so that there is a constant air seepage which can result in the continuous operation of the air compressor.

OBJECTS AND SUMMARY OF THE INVENTION

Accordingly, it is an object of this invention to provide a new and improved drain valve for removing collected moisture from a compressed air system.

Another object of this invention is to provide a unique automatic pneumatically operated drain valve for extracting the condensate from an air dryer of a compressed air system.

A further object of this invention is to provide an automatic drain valve device employing a rolling diaphragm for actuating an integral piston stem assembly which opens a ball valve for expelling moisture collected in an accumulating chamber to atmosphere.

Still another object of this invention is to provide an improved pneumatically actuated drain valve having a normally seated ball valve which is closed by the force of a compression spring and is assisted by the air pressure in the cavity of an air dryer of a compressed air system.

Still a further object of this invention is to provide novel drain valve device which vents accumulated moisture from an air dryer through a pneumatically operated ball valve and through a sintered exhaust muffler to atmosphere.

Yet another object of this invention is to provide an automatic pneumatically operated drain valve device for periodically removing moisture and contaminants from a compressed air system, said drain valve device comprising, a drain valve body and a cover member, a rolling diaphragm clamped at its outer periphery between the drain valve body and the cover member, a pressure chamber located on one side of the rolling diaphragm adjacent the cover member, a piston and stem located on the other side of the rolling diaphragm, a ball valve disposed in the drain valve body, a biasing spring normally urging the ball valve to a closed position, a moisture accumulation chamber located in the drain valve body, the piston and stem moving the ball valve to an open position to remove the moisture and contaminants from the moisture accumulation chamber when the pressure chamber is pressurized.

Yet a further object of this invention is to provide a unique drain valve device which is economical in cost, simple in design, reliable in service, durable in use and efficient in operation.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
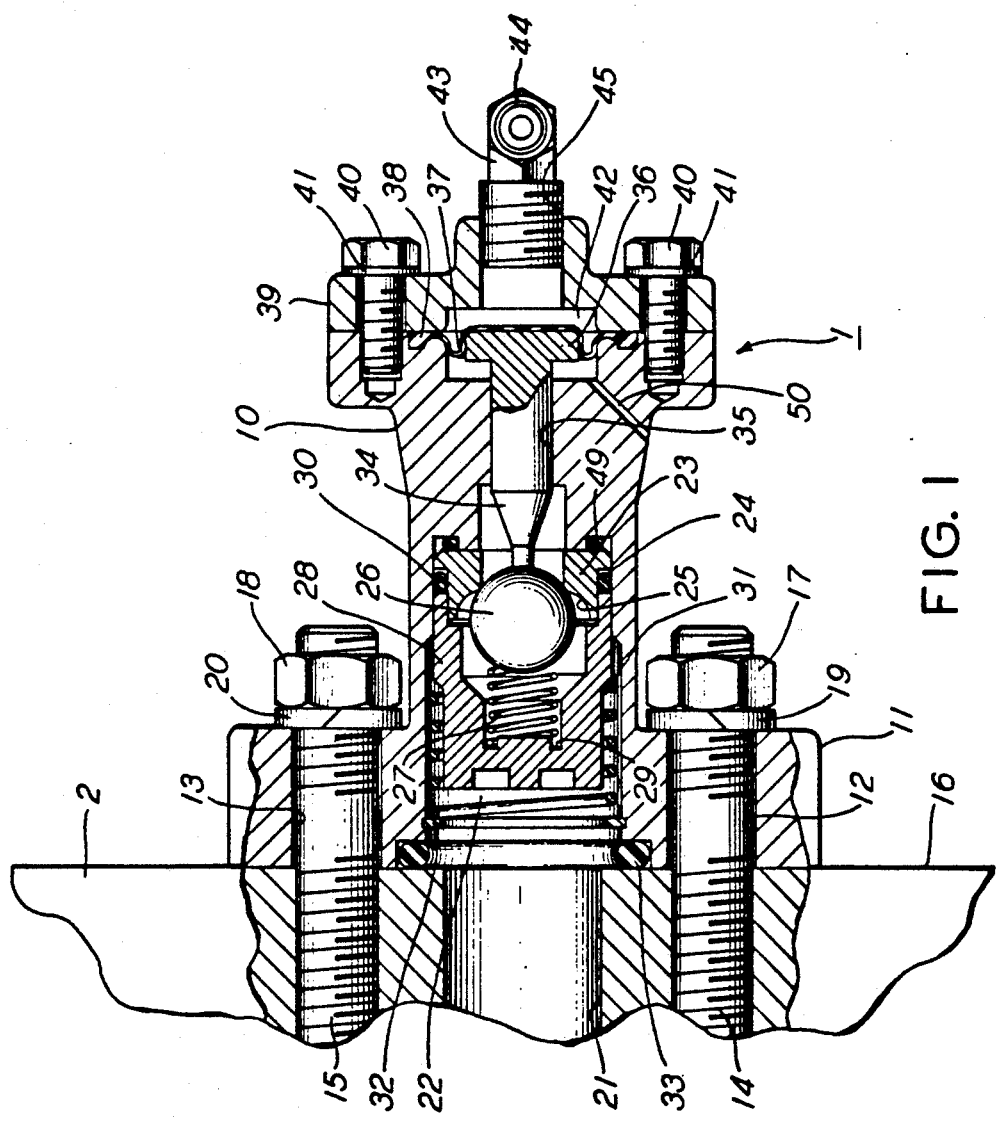
FIG. 1 is a top sectional view of an automatic pneumatically operated drain valve device which is mounted to the body of an air dryer of a compressed air system.
Figure 2:
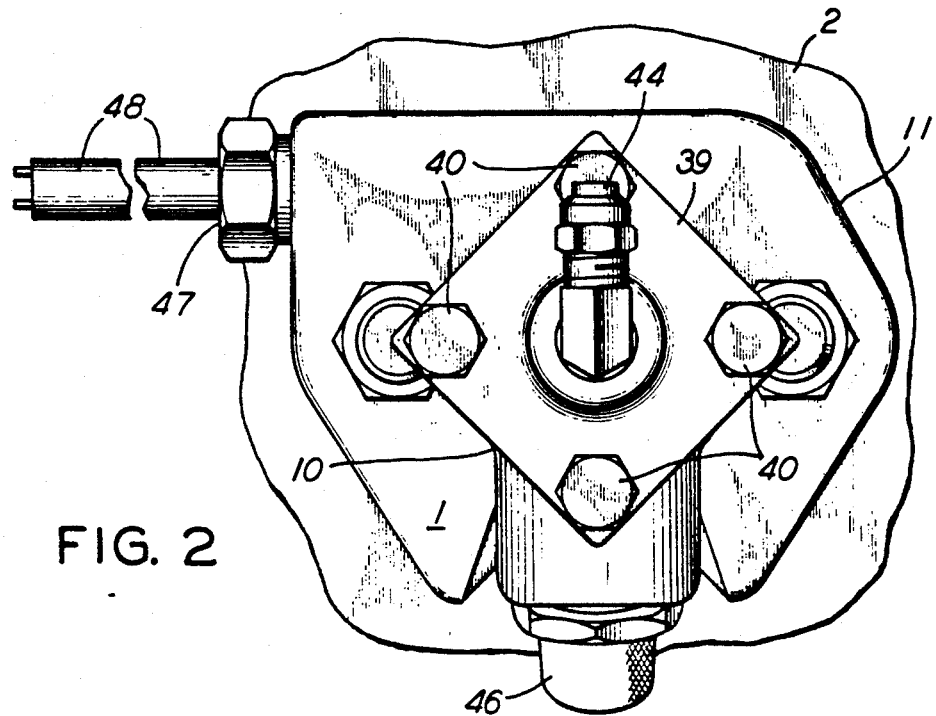
FIG. 2 is a front elevational view of the valve of FIG. 1.
Figure 3:
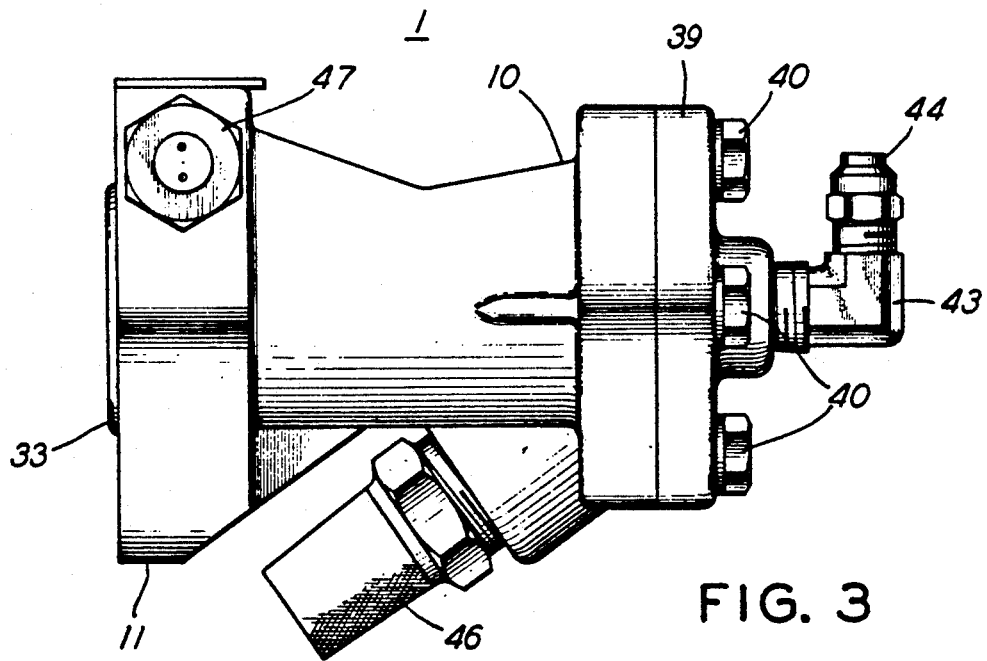
FIG. 3 is a side elevational view of the drain valve device of FIG. 1 which is devoid of the air dryer.

Referring now to the drawings, and in particular to FIGS. 1 and 2, there is shown the automatic pneumatically actuated drain valve device generally characterized by numeral 1 which is mounted to an air dryer 2 of a compressed air system. As shown in FIGS. 1, 2, and 3, the drain valve device 1 embodying the invention includes a casing or housing 10 that has integrally formed therewith a mounting flange 11. The flange member 11 has a pair of spaced apart through bore holes 12 and 13 through each of which extends a pair of threaded studs 14 and 15, respectively. In practice, the body of the air dryer is designed with a flange face 16 on which the drain valve 1 is mounted by the threaded studs 14 and 15 which are screwed into a pair of threaded holes which are in alignment with bore holes 12 and 13. The drain valve 1 is securely fastened to the threaded free ends of the studs 14 and 15 by nuts 17 and 18 and lock washers 19 and 20, respectively. It will be seen that the air dryer 2 is provided with an opening 21 which opens directly into one end of a collection or accumulation chamber 22 in the drain valve device 1 in the area of the flange 11. Thus, the moisture or water condensation in the air dryer may be accumulated in chamber 22 to be expelled to atmosphere as will be described in greater detail hereinafter. The other end of the collection chamber 22 is provided with a cylindrical type of valve seat member 23 which is sealed by packing material or rubber O-ring 24. It will be seen that the cylindrical member 23 includes a conical valve seat surface 25 on which a stainless steel ball valve 26 is normally seated by the force of a compression biasing spring 27 and the compressed air pressure present in the accumulation chamber 22. A cage member 28 includes an internal spring seat 29 which engages one end of the biasing spring 27 while the other end of the biasing spring 27 engages the peripheral surface of the ball valve 26. A sealing ring 30 is disposed between the cylindrical member 23 and the cage member 28, while a sealing ring 49 is disposed between cylindrical member 23 and the internal wall of the housing 10. A retaining spring 31 urges the cage member 28 to the position shown in FIG. 1, and an internal retaining ring 32 holds the spring 31 in place. An annular sealing ring or gasket seal 33 is disposed between the flange 11 and the face 16 of the air dryer 2.

As shown in FIG. 1, an operating stem or push rod 34 is slidably disposed within an internal bore 35 found in the casing 10. The one or free end of the operating stem 34 is adapted to engage the periphery of the ball valve 26 while the other end is integral with a follower member or piston 36 which is carried by a rubber rolling diaphragm 37. The diaphragm 37 includes an annular bead 38 formed on the outer peripheral edge. The annular bead 38 is clamped to the casing 10 and a cap member 39 by a plurality of bolts 40 and lock washers 41. A relief port 50 is formed in the body of housing 10 to eliminate strain and deformation on the underside of the diaphragm 37 by being vented to atmosphere. A pressure chamber 42 is formed between the inner surface of the cap member 39 and the outer surface of the rolling diaphragm 37. An elbow fitting 43 is threadedly screwed into an inlet port 45 which is in constant communication with the delivery side of a compressor governor or control unit solenoid (not shown) via conduit or pipe 44.

Referring now to FIGS. 2 and 3, it will be appreciated that the accumulated moisture is discharged to atmosphere through a sintered exhaust muffler member 46 which is threadedly screwed into the underside of the casing 10. Further, it will be seen that an electrical heater element 47 is located at the upper side portion of flange member 11. The heat element is energized via cable 48 during cold and/or freezing weather in order to prevent the collected moisture from freezing so that the purging action will operate satisfactorily even during the wintertime.

In describing the operation, let us initially assume that the compressor is running or turned on, the governor valve device or alternatively, the control unit solenoid device, ensures that the conduit 44 and, in turn, the pressure chamber 36 are not pressurized so that the ball valve is closed by the compressive force of return spring 27 and the pressure force in chamber 22. With the ball valve 23,26 seated, the moisture or water droplets formed in the air dryer cavity is collected in the accumulation chamber 22. Now when the compressor is unloaded or turned off, the governor valve device or the control unit solenoid device causes the pressurization of the pressure chamber 22 via conduit or pipe 44. The build-up of air pressure in chamber 22 causes movement of the rolling diaphragm 37 and results in linear shift of the follow member 36 and the operating stem to the left as viewed in FIG. 1. Accordingly, the stem 34 unseats the stainless steel ball 26 from the valve seat 25 so that accumulation chamber 22 is vented to atmosphere via the exhaust muffler 46. Thus, the air dryer 2 is purged and is ready for the next running cycle of the air compressor at which time the chamber 22 and pipe 44 are depressurized so that the returned spring and air pressure in the cavity of the air dryer 2 and chamber 22 close and positively seal the ball valve 23,26 and shift the stem 34, the follower 36 and the diaphragm 37 to the right as viewed in FIG. 1 so that the automatic drain valve device is ready for the next purging cycle.

It will be appreciated that the use of a rolling diaphragm improves the overall efficiency of operation since there is little, if any, frictional losses in moving the piston stem assembly which effectively opens and closes the ball valve. In addition, the rolling diaphragm provides a positive seal between the pressure chamber and the exhaust muffler which is open to atmosphere. Further, the use of a conically shaped valve seat and a stainless steel ball which is closed by a compression spring and is supplemented by the fluid pressure in the cavity of the air dryer eliminates permanent setting problems common in rubber type of valves. The use of an integral piston stem assembly eliminates the need of special fasteners and minimizes the machining requirements.

Thus, the present invention has been described in such full, clear, concise and exact terms as to enable any person skilled in the art to which it pertains to make and use the same and having set forth the best mode contemplated of carrying out this invention. It will be seen that the subject matter, which I regard as being my invention, is particularly pointed out and distinctly set forth in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. An automatic pneumatically operated drain valve device for periodically removing moisture and contaminants from a compressed air system, said drain valve device comprising, a drain valve body and a cover member, a rolling diaphragm clamped at its outer periphery between said drain valve body and said cover member, a pressure chamber located on one side of said rolling diaphragm adjacent said cover member, a piston and stem located on the other side of said rolling diaphragm, a ball valve disposed in said drain valve body, a biasing spring normally urging said ball valve to a closed position, said biasing spring is caged between the peripheral surface of said ball valve and a spring retainer member, said spring retainer is held in place by a compression spring and a retaining ring, a moisture accumulation chamber located in said drain valve body, said piston and stem moving said ball valve to an open position to remove the moisture and contaminants from the moisture accumulation chamber when said pressure chamber is pressurized.

2. The automatic pneumatically operated drain valve device for periodically removing moisture and contaminants from a compressed air system as defined in claim 1, wherein pressure in said moisture accumulation chamber assists said biasing spring in seating and sealing said ball valve.

3. The automatic pneumatically operated drain valve device for periodically removing moisture and contaminants from a compressed air system as defined in claim 1, wherein said ball valve includes a concaved seat.

4. The automatic pneumatically operated drain valve device for periodically removing moisture and contaminants from a compressed air system as defined in claim 1, wherein said drain valve body includes an integral apertured flange which is bolted to a body portion of an air dryer of the compressed air system.

5. The automatic pneumatically operated drain valve device for periodically removing moisture and contaminants from a compressed air system as defined in claim 1, wherein said ball valve includes a stainless steel ball.

6. The automatic pneumatically operated drain valve device for periodically removing moisture and contaminants from a compressed air system as defined in claim 1, wherein the moisture and contaminants are removed to atmosphere through a sintered exhaust muffler.

7. The automatic pneumatic operated drain valve device for periodically removing moisture and contaminants from a compressed air system as defined in claim 1, wherein a heater element is mounted onto said drain valve body.

8. The automatic pneumatically operated drain valve device for periodically removing moisture and contaminants from a compressed air system as defined in claim 1, wherein a fitting is connected to said cover member for conveying pressure to said pressure chamber.

9. The automatic pneumatically operated drain valve device for periodically removing moisture and contaminants from a compressed air system as defined in claim 1, wherein a relief port is connected to atmosphere to prevent the buildup of pressure on the underside of said rolling diaphragm.

* * * * *